United States
McCartney et al.

[11] 3,910,678
[45] Oct. 7, 1975

[54] FIBER OPTIC TUBULAR STAR CONNECTOR

[75] Inventors: Ronald L. McCartney, Orange; Eleanor A. Landgreen, Temple City, both of Calif.

[73] Assignee: International Telephone and Telegraph Corporation, New York, N.Y.

[22] Filed: Nov. 22, 1974

[21] Appl. No.: 526,270

[52] U.S. Cl. ............................. 350/96 C; 350/96 B
[51] Int. Cl.² ............................................. G02B 5/16
[58] Field of Search.. 350/96 C, 96 B, 96 R, 96 WG

[56] References Cited
UNITED STATES PATENTS

| | | | |
|---|---|---|---|
| 3,770,342 | 11/1973 | Dudragne | 350/96 B X |
| 3,846,010 | 11/1974 | Love et al. | 350/96 B X |

Primary Examiner—Seigfried H. Grimm
Attorney, Agent, or Firm—William T. O'Neil

[57] ABSTRACT

A multi-fiber optical cable connector including a star coupler employing a generally axially elongated spindle tapered at both extremities to form a pointed end at each extremity, these points lying substantially on the axial centerline of said spindle. An annular sleeve of transparent elastomer optical interface material surrounds the center portion of the spindle and both are contained in a coaxial sleeve having an inside diameter equal to the outside diameter of the said elastomer element. Then the connector shells holding the two optical fiber ends to be connected are mated, the tapered ends of the spindle feed into the fiber bundle essentially on the axial centerline and force the fibers outward and around the spindle body to a point of abutment against the annular elastomer piece from both sides.

10 Claims, 3 Drawing Figures

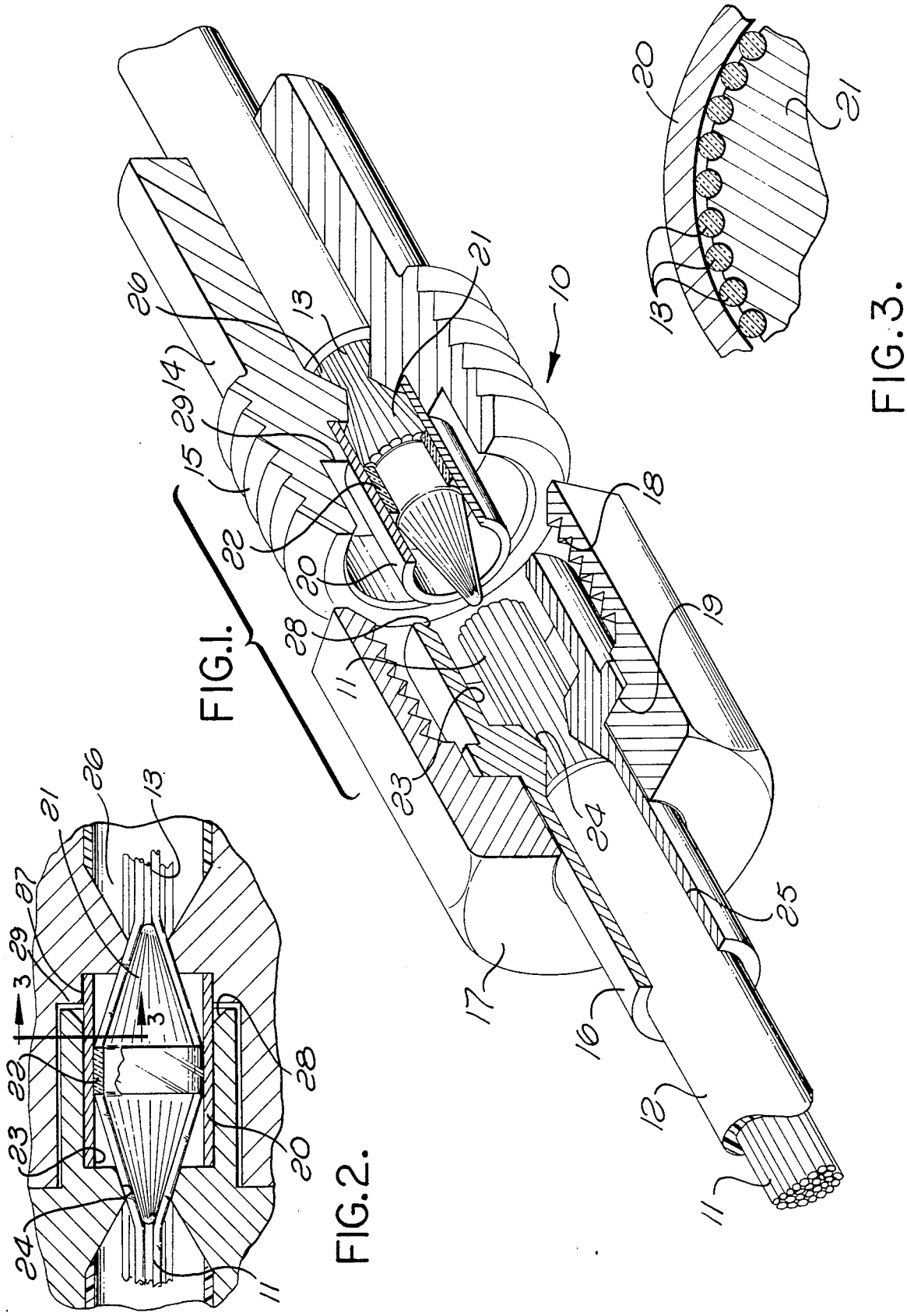

FIBER OPTIC TUBULAR STAR CONNECTOR

BACKGROUND OF THE INVENTION

1. Field of the Invention

The present invention relates to connectors for fiber optic cables.

2. Description of the Prior Art

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer coatings or jackets. The jacket makes them resemble ordinary metallic-core electrical cable upon superficial external inspection. Obviously, if fiber optic cables are to be used in practical signal transmission and processing systems, practical connectors for the connection and disconnection of fiber optic cables must be provided.

Before the prior art in respect to connectors, per se, is discussed, some references will be given for the benefit of the skilled reader in understanding the state of fiber optic art in general.

An article entitled "Fiber Optics" by Narinder S. Kapany, published in the "SCIENTIFIC AMERICAN," Vol. 203, Pages 72–81, dated November 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or offset, are among the factors effecting the light transfer efficiency at a connector. In this connection, attention is directed to the Bell System Technical Journal, Vol. 50, No. 10, December 1971, specifically to an article by D. L. Bisbee, entitled "Measurement of Loss Due To Offset, and End Separations of Optical Fibers." Another Bell System Technical Journal article of interest in Vol. 52, No. 8, October 1973, and was entitled "Effect of Misalignments on Coupling Efficiency on Single-Mode Optical Fiber Butt Joints" by J. S. Cook, W. L. Mammel and R. J. Grow.

The patent literature also contains much information relative to the state of this art. For example, U.S. Pat. No. 3,624,816 describes a "Flexible Fiber Optic Conduit." The device described therein uses a plurality of light conducting fibers in a flexible cable type arrangement.

Concerning the utility of fiber optic cables and therefore the utility of connectors for such cables, various systems are described in the patent literature which employ fiber optic cables. One example of such a utilization system is described in U.S. Pat. No. 3,809,908.

Yet another patent of interest is entitled "Glass Fiber Optical Devices," U.S. Pat. No. 3,589,793. That reference relates to the fiber optic bundles and the glass fibers themselves, as well as to a method of fabrication for the fiber optic elements themselves.

A selection of U.S. patents relating more particularly to optical cable connectors includes U.S. Pat. Nos. 3,790,791; 3,734,594, 3,637,284; 3,572,891; 3,806,225; 3,758,189 and 3,508,807 are representative of the connector prior art.

The bulk of the multi-fiber connectors presently in use employ the butt contact design. There are many variations falling under this general category, ranging from those employing optically polished ends which are brought together with a minimum interface, on the one hand, to the employment of matching broken-end faces within an index matching gel. Other variations on the above approach, i.e., on the butt contact principle, employ not only the index matching gel, but a transparent elastomer interface member to prevent abrasive deterioration of end faces of the optic fibers, particularly after a number of connect and disconnect cycles.

It is known that the consolidation and orientation of fibers in a closed hexagonal package (hexagon cross-sectional shape) at the point of abutment, provides an optimized light-transmitting capability. To implement such an optimum configuration, a predetermined number of fibers in a given fiber optic cable must be present in order to geometrically form into such a hexagonal array. The number of fibers which may be thus constrained into a hexagonal array is given by the formula:

$$P = 1 + 3N(N + 1),$$

where N = the number of circumferential layers about (in addition to) the single center fiber.

From the foregoing equation and a visualization of the hexagonal cross-sectional shape, it will be apparent that the hexagon must contain either 7, 19, 37, 61, 91, 127, etc., fibers. Moreover, any optical fiber bundle having a number of fibers other than these "perfect" numbers cannot be constrained into the optimum hexagonal package. U.S. patent application Ser. No. 514,820, filed Oct. 15, 1974, entitled: "Fiber Optic Connector And Assembly Method," shows such a hexagon arrangement and an alignment device therefor.

For very small fibers such as those on the order of 0.001 inches diameter, it would take 15 layers to produce a bundle 1/32 of an inch in diameter, and that bundle would contain 721 individual fibers. One disadvantage of using such a large number of individual fibers in a fiber optic cable, is the relatively high cost of handling and protecting against fiber breakage and the loss of information transmittal resulting therefrom.

Fiber optic cables with fewer larger fibers may be used, but it has been commonly considered impractical because of the problem of orientation and the difficulty of providing sufficient redundancy in the case of individual fiber breakage. Larger individual fibers can be more easily handled in assembly, and obviously have strength and stability advantages if they can be connected efficiently.

The manner in which the present invention deals with the disadvantages of the prior art will be evident as this description proceeds.

SUMMARY OF THE INVENTION

In accordance with the foregoing prior art discussion, it may be said to have been the general objective of the present invention to produce a connector or coupler most adaptable to fiber optic bundles having a relatively small number of relatively large individual fibers, where the design of the connector can be made to accommodate any integral number of fibers in a given bundle.

The present invention employs a "star coupler." The two fiber optic cables to be connected are each held in corresponding connector shells so that when the shells are mated the optical connection is made. Actually, there may be a plurality of cable pairs connected in accordance with the present invention. It will be evident that this can be accomplished in a larger connector shell configuration, once the concept of the present invention is understood.

The "star coupler" of the present invention comprises an outer tube and an inner spindle. The inner spindle is of generally circular cross-section, is elongated, and tapered to a point at either end. The greatest outside diameter of the spindle is less than the inside diameter of the outer tube. Within the said outer tube, and extending along a portion of the axial length of the spindle about the axial center thereof, is a tubular sleeve or cylindrical shell of a light-transmissive index matching elastomer interface material.

The tubular "star coupler" is an integral part of the connector, and is preferably permanently attached to one or the other of the connector shells. Within that connector shell, a fiber optic bundle is advanced (as the connector shells are mated) with the point of the spindle at the axis of the fiber optic bundle, so that the bundle spreads and "rides up" over the conical surface of the corresponding spindle end portion. An additional interface material comprising an optical gel may also be used as the opposing optical fibers make optical connection through the transparent elastomer sleeve and the said gel (if used). The use of the gel has several advantages, among these being the relief of axial tolerances in that, with the gel, a good optical connection may be made without bringing the opposing fibers directly against the elastomer sleeve.

A cross-section of the fiber ends adjacent to the point of abutment into the gel would reveal a distribution of fibers about a closed ring or annulus bounded by the body of the spindle and the inside diameter of the outer tube.

The invention also provides for alignment grooves generally axially in at least a portion of the tapered spindle ends to achieve a one-for-one optical fiber alignment.

The manner in which the invention may be advantageously constructed will be more fully understood from the following description.

BRIEF DESCRIPTION OF THE DRAWINGS

FIG. 1 is a partially cut-away view of a pair of mateable connector shells including a "star coupler" in accordance with the present invention.

FIG. 2 is a detail of the star coupler of FIG. 1.

FIG. 3 is a sectional view taken from FIG. 2, showing the details of optical fiber alignment to the point of abutment with the interface material.

DESCRIPTION OF THE PREFERRED EMBODIMENT

Referring now to FIG. 1, a typical connector arrangement embodying the present invention is illustrated, generally at 10, in partial cutaway form. A single pair of fiber optic cables comprising the fiber bundles 11 and 13, is illustrated as the optical cable pair to be connected. The usual jacket 12 is shown in connection with the fiber bundle 11 and it will be realized that a similar jacket would exist on the fiber bundle 13. These cables are essentially an article of commerce as will be realized from the prior art discussion. A pair of connector shells as represented by a first connector shell 16 and a second connector shell 14. From inspection of FIG. 1 it will be realized that the coupling nut 17 is essentially part of the connector shell 16 and serves to effect the intended connection by engagement of the internal threads 18 over the external threads 15, the latter on the external perimeter of the body of the second connector shell 14.

It will be evident from FIG. 1 that the mating of the first and second connector shells by the aforementioned thread engagement results from an inwardly directed thrust applied by the nut 17 against the internal shoulder 19.

The so-called "star coupler," according to the invention, comprises the double-ended conical spindle 21 which has a more-or-less cylindrical (untapered) central portion. The transparent elastomer interface member 22 which is actually in the shape of a cylindrical shell itself, plus the outer tube 20 and the spindle 21, comprise the star coupler. This outer tube 20 may be press-fit into a coaxial bore within second connector shell 14. This is shown more clearly at 27 in FIG. 2.

From this point forward in this description, it is helpful to refer back and forth between FIGS. 1 and 2. In FIG. 1, the connector is in position such that the mating of 14 and 16 may be accomplished by axial translation of these two connector shell parts toward each other until the engagement of the aforementioned threads can be effected. FIG. 2 illustrates those details of the star connector assumming the connector shells aforementioned are fully mated. Thus, the inward projecting tubular portion of connector shell 16 has an inside diameter 23 which is sized to provide a sliding fit of the part 20 therein. The inward end of that part may be chamfered at 28 in order to provide an easy entry for outer tube 20 with the bore 23. The said chamfered end 28 comes to rest against the inside shoulder 29. In FIG. 2, this relationship is quite clear. The transparent elastomer interface part 22 actually supports the spindle 21 within the outer tube 20, either by means of a pressfit or with the aid of adhesives between the internal surface of the outer tube 20 and the part 22, as well as between 22 and the spindle 21.

It will be realized from FIG. 2 that the central portion of the spindle 21, over which the part 22 fits, may actually have somewhat of an undercut. That is, the diameter of the spindle in this central generally cylindrical portion, may actually be slightly less than the diameter of the two tapered conical end portions thereof in a plane nearest the said central portion. In this way an additional mechanical axial constraint can be provided in the form of a retaining groove in 21.

The optical fibers themselves, which in this art, may be of quartz glass or similar glass material, exhibit very little creep or permanent set and are relatively flexible. Thus, in the process of assembly, the strands of the fiber bundle 13 are forced outward over the surface of the spindle 21 and brought to bear against the facing surface of the part 22. The clearance between the inside diameter of the outer tube 20 and the spindle 21 immediately adjacent this point of fiber abutment against 22, is just sufficient to allow for the individual fiber diameter which now arrange themselves around the ring or annulus comprising this interface.

According to the foregoing, as this embodiment is described, it is assumed that the interface between the fiber optic bundle 13 and the part 22 is permanent and remains undisturbed throughout the connection or disconnection process. The fiber optic bundle 11, on the other hand, because of the aforementioned characteristics of the glass fibers, will spread out over the corresponding spindle cone surface and abut the part 22 from the other side during mating. After disconnection, the fibers will "spring back" to their more-or-less original bundle shape, much as illustrated in FIG. 1.

As a matter of design, the internal surface 24 of connector shell 16 serves to provide some mechanical pressure holding the optic fibers against the spindle surface. This may, of course, also be true in respect to the cable fibers 13 within part 14. As a more or less incident point, it is noted that the jackets of the fiber optic cables could be retained within the outer sleeves of the connector shell parts 16 and 14, for example, at 25, in respect to the jacket 12 of the optical bundle 11. Due to the internal shape of these connector shell parts, a cavity, typically 26, can provide for the introduction of an adhesive material or a potting resin to provide additional axial stability for the cables themselves within the respective connector shells.

Of course, it will be evident that the "star coupler," in accordance with the present invention, could be applied to larger connectors providing plural connections. The connector shell arrangement illustrated in FIG. 1 is not unlike those universally familiar in the electrical connector art, and, of course, there are multiple connection shells in that art which could be adapted to the plural connection situation hereinbefore referred to.

Moreover, once the concept of the present invention is understood, various other modifications will suggest themselves to those skilled in this art, for example, there is some obvious design choice in the axial length of the outer tube 20. It may be shortened so that its projection on either side of part 22 is considerably less than the length of the corresponding spindle tapered portion.

Although it is anticipated that the tapered ends of the spindle 21 would be linear conical sections, i.e., linearly tapered, some variation of that surface shape is obviously possible. In fact, if the conical surface tended to flatten out as it approached the central cylindrical section, there would be more of a tendency for the optical fiber ends to abut the interface transparent elastomer part 22 more nearly normal to the annular end surfaces of part 22.

The introduction of a gel in the vicinity of the fiber abutments against the part 22 would be a normal expedient otherwise known in this art. Relief from axial tolerances is thereby gained in that, the fibers need not tightly abut 22 if the gel is present, and the hazard of mechanical damage to the fiber ends is reduced.

Referring now to FIG. 3, the section 3—3, as taken through FIG. 2, shows a number of generally axial grooves in the tapered or conical surfaces of the spindle ends. If the number of such grooves equals the number of fibers in the corresponding fiber bundle, an additional means is provided which permits and facilitates a one-to-one optic fiber relationship as the fibers face each other from opposite annular surfaces of 22. These grooves need only extend part way toward the pointed end of the conical spindle on either side, as will be obvious from FIG. 2.

Since there are no requirements for materials of exceedingly high strength or other unusual characteristics, the connector shells, the outer tube 20 and the spindle 21 may be fabricated from metals or other materials otherwise suitable for the environment in which the connector must function. The spindle itself could be metal, glass or any one of a number of other relatively stable materials. Considerable design choice exists in that connection.

The interface transparent elastomer part 22 may be made from RTV, a transparent silicon rubber, to give one example.

The drawings and the foregoing description are intended to be illustrative and typical only and should not be regarded as limitations on the scope of the invention.

What is claimed is:

1. A fiber optic connector for dismountably joining at least first and second fiber optic cables each including a fiber bundle having a plurality of individual light transmissive fibers, said connector including first and second mateable connector shells in which said first and second cables are respectively secured and positioned colinearly, comprising the combination of:

an axially elongated spindle having an axially defined central portion and first and second tapered end portions the surfaces of said spindle ends converging substantially to corresponding points on the axis of said colinearly positioned cables;

an optical interface element comprising an annular sleeve of a transparent elastomer material positioned about said spindle central portion and having an axial dimension at least a fraction of the axial dimension of said central portion;

means for mechanically securing the outside circumferential surface of said interface element with respect to one of said connector shells, thereby to provide distribution of the fibers of said cables over the surface of said spindle tapered end portions to bring said fibers into axial contact each with a corresponding axially facing end of said interface element in a single circumferential fiber layer.

2. A fiber optic connector for dismountably joining at least first and second fiber optic cables including corresponding first and second fiber bundles of plural individual light transmissive fibers, said connector including first and second mateable connector shells in which said first and second cables are respectively secured and colinearly positioned, comprising the combination of:

an axially elongated spindle having an axially defined central portion of substantially cylindrical surface shape and first and second end portions tapered substantially to corresponding points along the axis of said colinearly positioned cables;

an optical interface element comprising a transparent elastomer in the shape of a cylindrical shell, said interface element being secured at least frictionally about said spindle central portion, said interface element having an axial length not exceeding the axial length of said spindle central portion;

a guide sleeve of generally tubular shape and of substantially annular cross-sectional shape, said sleeve having an inside diameter, at least within a central portion thereof, as compared to the outside diameter of said interface element such that said interface element and said spindle are secured at least frictionally within said guide sleeve central portion;

means including a bore within said second connector shell whereby said guide sleeve is axially and colinearly secured with respect to said axis of said cables, said spindle second end portion defined as being on the side toward said second cable, said second cable fibers being diverged outward over the surface of said spindle second end portion within said guide sleeve to a position of secured contact with the corresponding axial end of said interface element, and said first cable fibers diverging outward over the surface of said spindle first end portion within said guide sleeve to a position of contact with the corresponding axial end of said interface element when said first and second connector shells are mated.

3. Apparatus according to claim 2 in which said interface element axial length is substantially equal to said axial length of said spindle central portion.

4. Apparatus according to claim 2 in which said guide sleeve is defined as having an axial length greater than the axial length of said spindle portion.

5. Apparatus according to claim 2 in which said guide sleeve is defined as having an axial length not exceeding the overall axial length of said spindle.

6. Apparatus according to claim 4 in which said spindle tapered ends are linearly tapered.

7. Apparatus according to claim 4 in which said interface element has a wall thickness substantially equal to the diameter of an individual fiber of either of said cables plus an allowance for radial tolerances, thereby to produce a single circumferential layer of said fibers at said point of contact with said interface element.

8. Apparatus according to claim 2 in which said spindle tapered end portions have axial grooves along an axial distance extending outward from said spindle central portion over at least a portion of the lengths of said end portions.

9. Apparatus according to claim 4 in which said spindle tapered end portions have surface grooves extending generally axially over a fraction of said spindle end portions outward from said spindle central portion, thereby to provide guide means whereby said fibers are uniformly circumferentially distributed at said point of contact with said interface element.

10. Apparatus according to claim 9 in which each of said surface grooves on one end portion of said spindle is circumferentially matched with a corresponding groove on the other end portion of said spindle, thereby to provide fiber-to-fiber alignment between said fibers of said first and second cables, the number of said grooves equalling the number of fibers in the corresponding cable.

* * * * *